United States Patent

[11] 3,567,918

| [72] | Inventor | Karl Schable<br>68 Fersenbruch, Gelsenkirchen, Germany |
| --- | --- | --- |
| [21] | Appl. No. | 769,614 |
| [22] | Filed | Oct. 22, 1968 |
| [45] | Patented | Mar. 2, 1971 |
| [32] | Priority | Oct. 24, 1967 |
| [33] | | Germany |
| [31] | | 1,655,189 |

[54] CENTRIFUGALLY OPERATED CORNERING ILLUMINATOR FOR AUTOMOTIVE VEHICLES
7 Claims, 4 Drawing Figs.

[52] U.S. Cl.................................................. 240/8.24,
240/7.1, 240/8.2, 240/122
[51] Int. Cl..................................................... B60q 1/12
[50] Field of Search......................................... 240/8.2,
8.22, 8.24, 122, 7.1 (A); 200/80 (A), 61.45, 80,
152.5, 152.6, 152.7

[56] References Cited
UNITED STATES PATENTS

| 1,600,121 | 9/1926 | Mazade...................... | 200/152.7 |
| 2,542,211 | 2/1951 | Sauri.......................... | 240/8.24 |

Primary Examiner—John M. Horan
Assistant Examiner—T. A. Mauro
Attorney—Karl F. Ross ABSTRACT: A light system for directing headlight beams in the direction of vehicle turning in which at least one lamp on the vehicle is trained in each cornering direction and a centrifugally operated switch selectively illuminates the lamps. The switch comprises a hollow body containing a centrifugally displaceable liquid (e.g. mercury) and has upwardly divergent arms each receiving a respective contact in an electrical circuit with the corresponding layer. A central contact may be connected to one pole of the supply network. The switch preferably lies in a vertical plane perpendicular to the direction of travel on the vehicle.

PATENTED MAR 2 1971 3,567,918

Karl Schäble
INVENTOR

BY

Karl F. Ross
Attorney

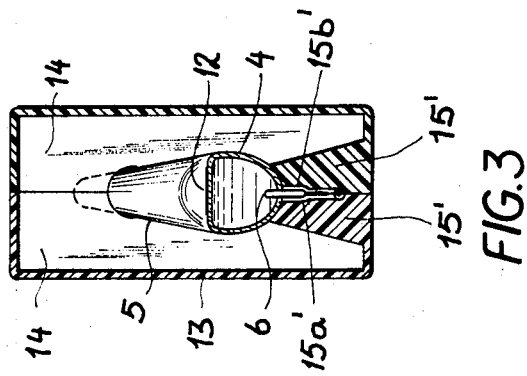
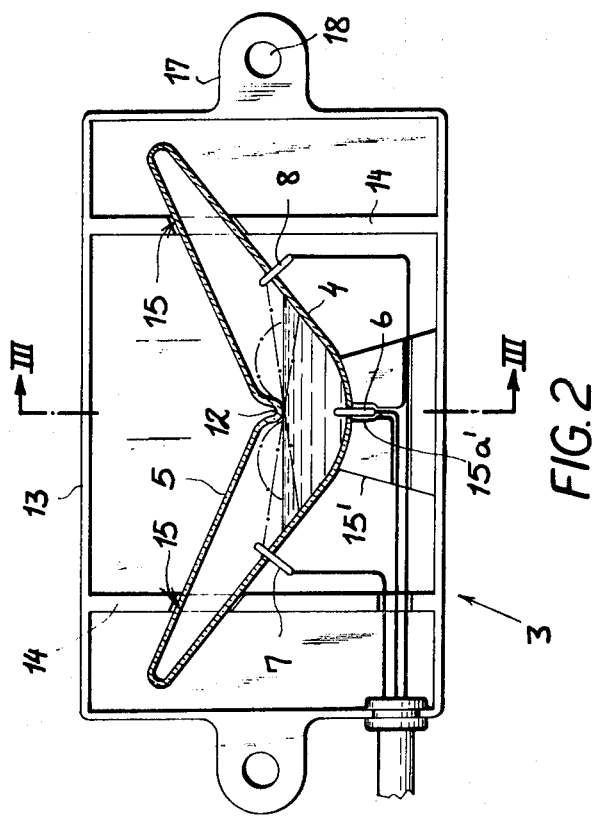

3,567,918

CENTRIFUGALLY OPERATED CORNERING ILLUMINATOR FOR AUTOMOTIVE VEHICLES

My present invention relates to a turn-illuminating system for an automotive vehicle.

It has already been proposed to provide automotive vehicles, e.g. automobiles, with a headlamp system designed to illuminate the road surface ahead of an automobile as the latter turns right or left so that the road surface curving away from the vehicle but in the direction of travel thereof is illuminated in addition to or in place of regions directly ahead of the vehicle. Such systems constitute improvements of earlier devices in which the headlight beams were fixedly oriented and could illuminate only regions directly ahead of the vehicle; upon turning, consequently, the road surface in the direction of the turn was barely illuminated, if at all.

Earlier turn-illuminating systems have generally provided an on-off switch capable of turning on the lights at dark and have permitted the light beam to be trained upon the road surface extending to the right or left of the vehicle by a mechanism which allows the cornering headlamps to be pivoted together with the front wheels. The linkage required for this system was difficult to adjust, relatively complex and expensive and resulted in an orientation of the beam identical to that of the steered wheels. As a result of the fact that the orientation of the steered wheels often does not correspond to the further path of the road surface, dead spots frequently develop in such arrangements. Moreover, since the mechanisms are operative day and night, they tend to wear rapidly since separate mechanisms may be required for right- and left-hand turns, the cost of the mechanism is increased still further. It has also been observed that the swinging movement of the lamps relatively to the vehicle body has a disturbing effect on oncoming traffic.

It is, therefore, a principal object of this invention to provide an improved system for the illuminating of curves and, more generally, the direction of vehicle turning.

Another object of this invention is to provide an improved curve-illumination arrangement for the cornering of automotive vehicles.

I have now found that it is possible to avoid the aforestated disadvantages and provide a highly effective curve-illumination arrangement for the automotive vehicle by fixedly mounting the right-hand and left-hand cornering headlamps of the system in the vehicle while training them to the right and to the left, respectively, and providing a centrifugally operable switch responsive to incipient deviation of the vehicle from a straight travel path for illuminating the associated lamp.

According to this invention, the switching device comprises an evacuated envelope containing a centrifugally displaceable liquid and having a pair of upwardly extending arms provided with respective contacts operable by the fluid. The envelope lies in a vertical plane perpendicular to the direction of vehicle travel so that any tendency of the vehicle to turn to the right will cause the liquid to sweep into the left-hand arm of shank of the envelope and operate the contact system there; the commencement of a left-hand turn will result in centrifugal displacement of the contact liquid to the right and a corresponding energization of the cornering headlamp turned toward the left.

Since the cornering headlamps of the present invention are immovable with respect to the vehicle body, except for the usual adjusting screws and the like, the disadvantages of the previously required lever systems for swiveling the lamp can be avoided. Furthermore, the switching device maintains the cornering lamps in a deenergized state in the absence of incipient cornering of the vehicle so that there is no danger that the unnecessary illumination of the system will, together with the main headlamps, confuse or disturb oncoming motorists. Breakdown of complex mechanical arrangements is avoided and, since the switch is centrifugally operated, deenergization of the lamps results as soon as the vehicle is restored to a substantially straight travel line.

According to a more specific feature of this invention, the arms of the envelope diverge upwardly from one another and are joined by a curved bight retaining the conductive liquid, preferably mercury, when the vehicle is not turning. The main contact of the switch is anchored in the envelope at the bight and substantially in the vertical median plane of the U-shaped or V-shaped envelope while contacts assigned to the right-hand and left-hand cornering lamps are provided in the left-hand and right-hand shanks or arms of the envelope, respectively, just above the normal level of the mercury on straight travel.

According to a more specific feature of this invention, the main contact of the switching device is lodged in the outer wall of the tube at the bight while the inner wall of the bight is kinked or provided with a protuberance reaching substantially to or below the level of the mercury pool therein when this pool is in its normal position for straight travel (i.e. a quiescent state). The protuberance acts to prevent or restrict sloshing of the mercury pool and thus oscillation thereof with undesirable alternate operation of the right- and left-hand contact as might otherwise occur should the vehicle encounter rough road surfaces, potholes and the like.

According to still another feature of this invention, the centrifugally operated switch is mounted in a housing which is formed of a pair of mirror-symmetrical housing halves with support ribs or webs cooperating with one another and with the arms and bight of the switch to support the envelope.

The system has been found to represent a marked improvement over earlier devices since the amount of mercury in the pool can be dimensioned such that the appropriate lamp is ignited when the vehicle encounters relatively long-radius or "wide" curves or turns as well as short-radius "tight" curves. Since the device is automatic, the system is greatly simplified by comparison with earlier arrangements and involves substantially no mechanical motion whatsoever. The danger of breakdown is greatly reduced and the cornering headlamps, which can be the usual fog or halogen lamps and the like, can be permanently positioned at the desired angle with respect to the longitudinal axis of the vehicle.

The above and other objects, features and advantages of the present invention will become more readily apparent from the following description, reference being made to the accompanying drawing in which:

FIG. 2 is an elevational view through the device with one-half of the housing cover removed;

FIG. 3 is a cross section taken along the line III-III of FIG. 2; and

Figure 4:
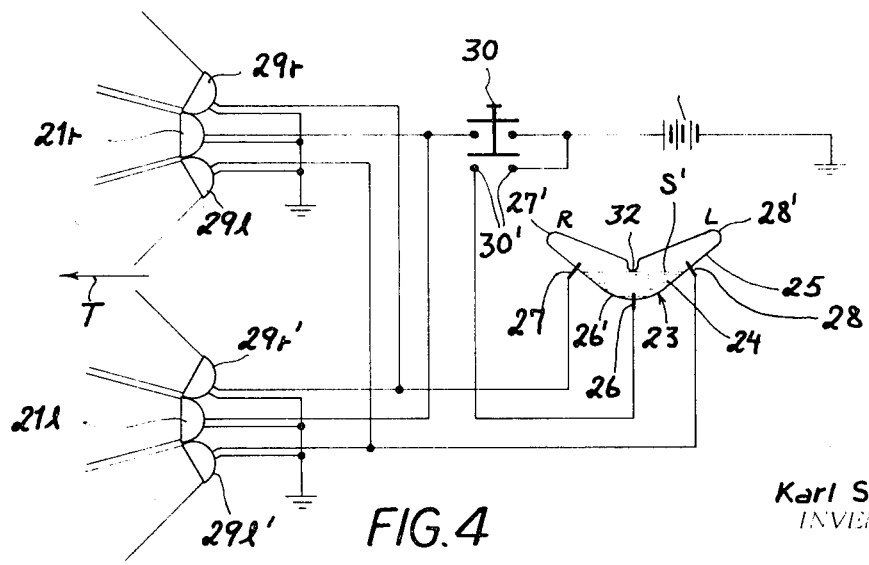
FIG. 4 is a circuit diagram illustrating the operation of the lamp system of the present invention.

Referring first to FIG. 4 of the drawing, it can be seen that the headlamp system of this invention may include a pair of principal headlamps 21r and 21l which are connected in parallel to one another to one contact of a light switch 30 which is returned to a terminal of the ignition battery 31. The other terminal of the latter is grounded while the other side of each of the main headlamps 21r, 21l is also grounded to the vehicle body.

In addition to this primary headlamp system, the vehicle may have a pair of weights of cornering headlamps such as the headlamps 29r and 29r', permanently oriented to the right with respect to the direction of vehicle travel and flanking the primary headlamps 21r and 21l, respectively. The lamps 29r and 29r' are tied to the right-hand contact 27 of a centrifugally responsive switch 23 of generally U-shaped configuration. The envelope 25 of this switch is composed of glass and is evacuated after a pool of mercury 24 has been introduced into the envelope. The pool of mercury suffices to immerse the center contact 26 which is anchored in the outer wall of the arcuate bight 26' of this switch and to bridge this contact with the right-hand lamp contact 27 or the left-hand contact 28 but not both. The contacts 27 and 28 are lodged in the outer walls of the upwardly diverging shanks 27' and 28' of the U while a projection 32 depends from the inner wall of the bight to the surface S' of the mercury pool to limit oscillation of the latter.

Intermediate contact 26 is connected in series with contacts 30' of the light switch 30 of the vehicle to the positive pole of the battery 31. The contact 28 is, of course, connected to the cornering lamps 29l and 29l' which are oriented to the left as shown in FIG. 4, assuming a direction of travel as represented by the arrow T. The sides of the cornering lamps not connected to the contacts are grounded in the usual manner.

As the vehicle swings to the right in a right-hand turn, centrifugal force drives the mercury of pool 24 into the left-hand arm of the U-shaped envelope 23, thereby bridging the contacts 26 and 27 and illuminating the lamps 29r and 29r' which are directed to the right to illuminate the road surface ahead of the turning vehicle in the direction of the turn. During straight travel, the pool of mercury 24 remains in its position shown in FIG. 4 so that, even with the light switch 30 in its closed position, there will be no operation of the cornering lamps. When the vehicle begins to turn to the left, the mercury pool will sweep into the right-hand arm of the envelope 25, thereby bridging the contacts 26 and 28 to illuminate lamps 29l and 29l' directed to the left. During daylight hours, switch 30 remains open.

Figure 1:
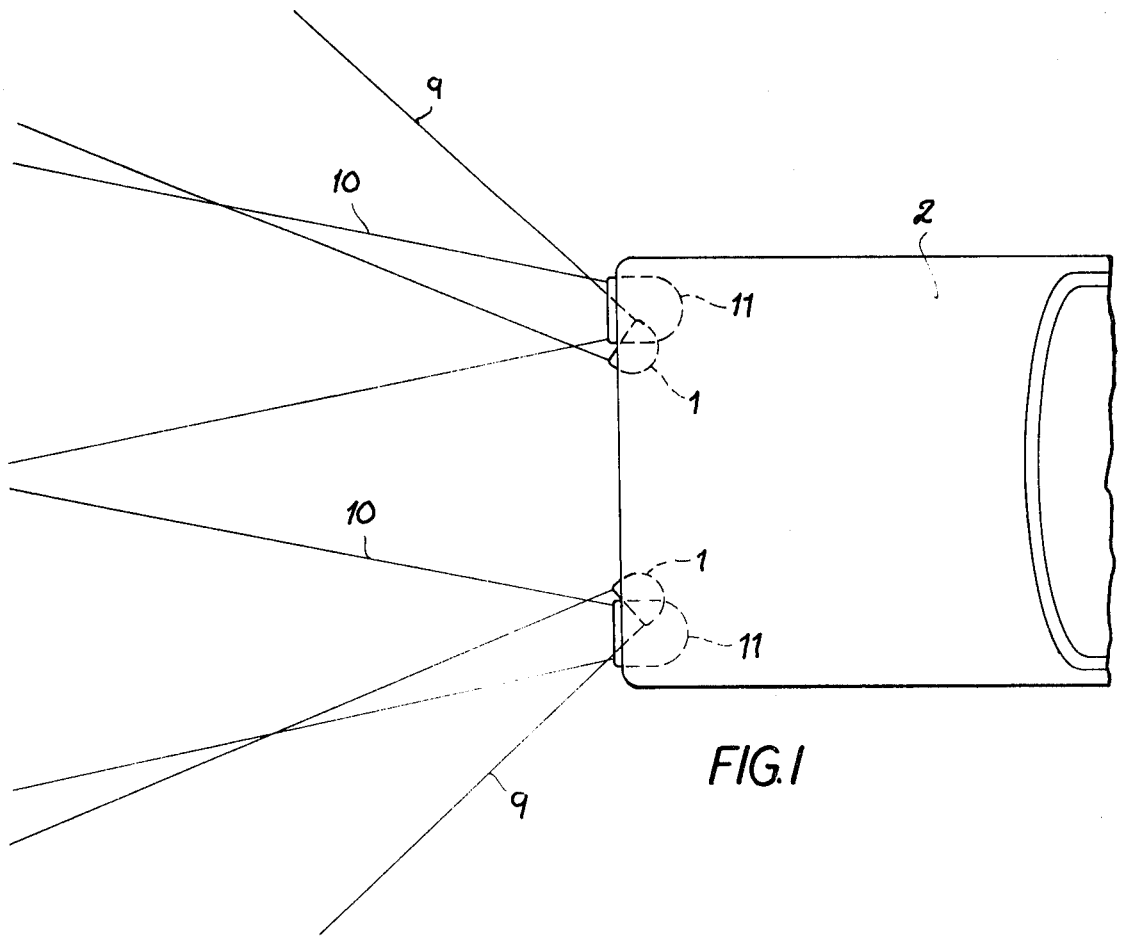
FIG. 1 is a plan view of an automotive vehicle provided with a turn-illuminating system, according to the present invention.

As has been noted, the envelope may also be generally V-shaped as can be seen from FIGS. 1—3. In these FIGS., the curve-illuminating lamps 1 for the motor vehicle 2 are provided with an on-off switch 3 of automatic action. The switch 3 comprises a V-shaped envelope 5 which is evacuated and contains in its bight portion a pool of mercury 4 into which an intermediate contact 6 extends. In the upwardly divergent arms of the vacuum tube 5 above the mercury pool 4, I have provided a pair of limiting contacts 7 and 8 such that the mercury pool 4, as a result of the centrifugal force generated when the vehicle commences a turn, bridges the respective contact 7 or 8 with the intermediate contact 6 to close an electrical circuit (see FIG. 4).

To this end, the intermediate contact 6 is connected to one pole of a battery and the limiting contacts 7 and 8 each to one side of the right and left lamps 1, respectively, the other side of each lamp and the other terminal of the battery being grounded. The light beams or cones 9 of lamps 1 are shown to be oriented to the left and right respectively of the light beams 10 of the main headlamps. Above the normal level of the mercury pool, I have provided the projection 12 which limits sloshing of the mercury pool when rough road surfaces or motions, less than those involved in turns, are encountered.

The vacuum tube 5 is mounted in a two-part housing 13, the members of which form a box which can be affixed by lugs 17 and screws 18 together and/or to the vehicle body, e.g. in the region of the dashboard. The rectangular housing parts are formed with vertical ribs 14 containing cutouts 15 adapted to receive the arms of the V and with pedestals 15' upon which the bight portion of the tube rests. The webs are designed to substantially bear upon one another when the two halves of the housing are clamped together so that they constitute stiffening members as well. Cutouts 15a' and 15b' in the pedestals 15' serve to receive the portion of the contact 6 extending from the bight of the envelope. The housing portions are mirror-symmetric.

As the vehicle begins its arcuate motion at a curve, the pool 4 shifts bodily under the centrifugal force to right up the arms of the envelope and make contact with the respective members 7 and 8 represented by dot-dash lines. As a result of the projection 12, which extends the full width of the pool 4 (FIG. 3), the normal vehicle movement produce perturbations in the surface of the pool as represented by the broken lines in FIG. 2, which do not suffice to operate the lamps.

The improvement described and illustrated is believed to admit of many modifications within the ability of persons skilled in the art, all such modifications being considered within the spirit and scope of the invention except as limited by the appended claims.

I claim:

1. A turn-illuminating system for an automotive vehicle comprising a pair of turn-illuminating lamps respectively trained to the right and left sides of said vehicle and substantially fixedly positioned therein; circuit means for selectively energizing said lamps; and switch means responsive to the centrifugal force of an incipient turn of said vehicle to the right and left, respectively, and connected to said circuit means for energizing the corresponding lamp, said switch means including an evacuated tube having a pair of arms interconnected by an arcuate trough receiving a pool of conductive liquid, a pair of contacts in said arms engageable by said pool end respectively connected to said lamps, a central contact continuously engaging said pool, said tube being formed with a surge-suppressing downwardly extending projection above said trough and reaching substantially to the surface of said pool in a quiescent state thereof.

2. The system defined in claim 1 wherein said liquid is mercury.

3. The system defined in claim 1 wherein said trough is an arcuate bight portion receiving said pool in the quiescent state thereof, and said arms are upwardly divergent and upwardly tapering from said bight portion, the contacts of said pair being anchored in said bight portion.

4. The system defined in claim 3 wherein said central contact is anchored in an outer wall of said bight portion opposite said projection.

5. The system defined in claim 4, further comprising means for mounting said envelope on the body of said vehicle in a vertical plane perpendicular to the direction of movement of said vehicle.

6. The system defined in claim 3, further comprising housing means enclosing said envelope.

7. The system defined in claim 6 wherein said housing means includes a pair of mirror-symmetrical housing portions together forming a box of rectangular configuration, each of said housing portions being formed with a pair of ribs having registering cutouts receiving the respective arms, with a pedestal between said ribs for supporting said bight portion of said envelope, and with means for securing said housing portions together.